July 4, 1972  R. J. MAYER ET AL  3,674,598
APPARATUS FOR PRODUCING A THREE-DIMENSIONAL WORK OF ART
Filed July 23, 1970
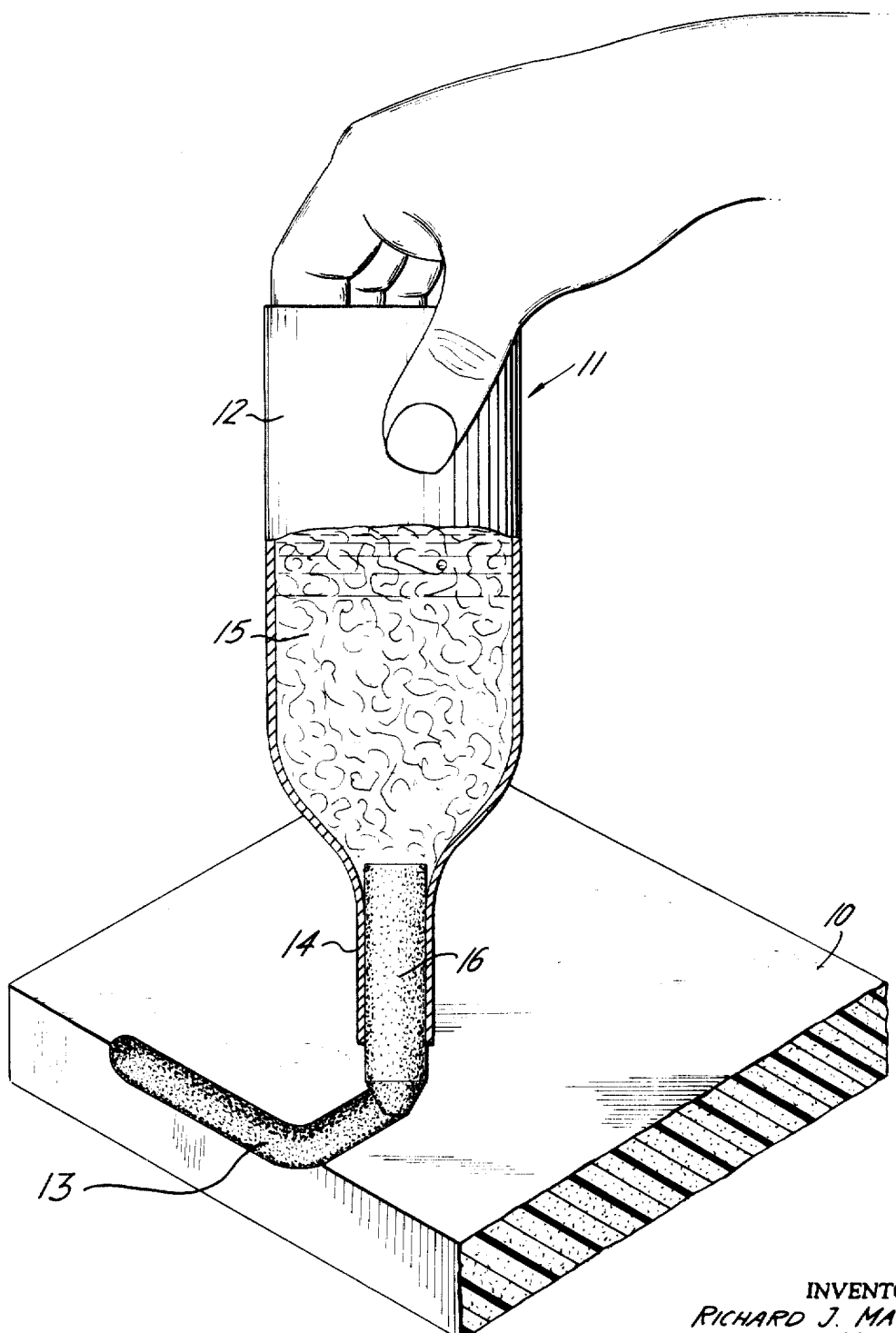
INVENTORS.
RICHARD J. MAYER
BENJAMIN KINBERG
BY
AGENT

United States Patent Office 3,674,598
Patented July 4, 1972

3,674,598
APPARATUS FOR PRODUCING A THREE-DIMENSIONAL WORK OF ART
Richard J. Mayer, 790 Smith Road, Parsippany, N.J. 07054, and Benjamin Kinberg, 425 Riverside Drive, New York, N.Y. 10027
Filed July 23, 1970, Ser. No. 57,615
Int. Cl. B44b 1/00; B44c 1/22
U.S. Cl. 156—345
4 Claims

ABSTRACT OF THE DISCLOSURE

Three-dimensional pictures and the like are formed by applying a mix of ink and solvent to selected portions of the surface of a body of expanded polystyrene to simultaneously etch and color the body at the point of application. The ink and solvent mix is applied with a hand held applicator having a liquid reservoir containing the mix and a porous fiber tip through which the mix is applied to the body of expanded polystyrene.

BACKGROUND OF THE INVENTION

The present invention relates to the visual arts and more particularly to the production of a three-dimensional work of art.

In the past three-dimensional works of art have been produced by many methods including moulding pliable materials with the hands, carving solid materials with a knife or chisel, hammering malleable metals, and the charring of wood with heated tools. Using the prior art methods a considerable length of time is generally required to complete a three-dimensional work of art and considerable skill is usually necessary to produce a pleasing end product. Also, if it is desirable that the end product be colored, with the prior art methods the coloring is necessarily an additional process which must be carried out after the object has achieved its final shape.

SUMMARY OF THE INVENTION

It is an object of the present invention to provide a novel method and apparatus for producing a three-dimensional work of art.

Another object is to provide such method and apparatus whereby a pleasing work of art may be produced quickly with the skill possessed by the ordinary person.

Another object is to provide such method and apparatus whereby the end product is colored as it is being shaped.

These objects are accomplished by providing a body of material capable of being rapidly dissolved by a solvent, a quantity of solvent, and an applicator for the solvent. The three-dimensional work of art is produced by applying the solvent to selected portions of the surface of the body to dissolve the material at the point of application and etch the body. Simultaneous coloring of the body is achieved by mixing a coloring agent with the solvent prior to application.

BRIEF DESCRIPTION OF THE DRAWING

A preferred embodiment of the invention has been chosen for purposes of illustration and description and is shown in the accompanying drawing wherein:

The single figure of the drawing is a view partly in section illustrating the method and apparatus of the present invention.

DETAILED DESCRIPTION OF THE INVENTION

Referring now to the drawing there is shown a body 10 of expanded polystyrene plastic, commonly known as Styrofoam, and a handheld tool or applicator 11 with which a mix of solvent and an ink is applied to the body 10 to simultaneously dissolve and color the polystyrene and produce a colored depression as shown at 13.

The applicator 11 includes a metal container 12 having a neck 14, a mass of absorbent material 15 such as cotton within the container, and a porous tip 16 positioned in and extending from the neck 14. The absorbent material 15 is saturated with a mix of a coloring agent, such as an ink, and a solvent which readily dissolves polystyrene, such as, acetone, methylene dichloride, or lemon oil.

Expanded polystyrene is composed of innumerable small gas bubbles or pockets each of which is surrounded by a very thin film of hardened polystyrene plastic. When the applicator tip 16 is brought into contact with the body 10, the mix of coloring agent and solvent flows through the tip by capillary action onto the body 10. The solvent instantly dissolves the thin polystyrene films surrounding the gas bubbles at the point of application, and, with a slight pressure the tip can be moved rapidly through the expanded plastic in any direction. For example, grooves in the body 10 (of the type shown in the drawing) having a depth of ⅛ inch can be made at a rate of one inch of length per second.

The plastic dissolved by the solvent is colored by the coloring agent present in the applied mix. The solvent is immediately dispersed by evaporation and absorption by the adjacent undissolved polystyrene. The dissolved plastic, which is now colored, quickly re-solidifies to produce a colored coating on the etched surface.

A number of applicators 11, each having a different colored ink mixed with the solvent, can be used to produce multi-colored three-dimensional works of art.

The terms "mix," "mixing," and "mixed" used herein in the specification and the claims are used in their broadest sense and relate to mixtures, solutions, suspensions, and the like and to their preparation.

It will be seen from the foregoing that the present invention provides a novel method and apparatus with which a person of ordinary skill can quickly produce a pleasing three-dimensional work of art which is colored as it is shaped.

We claim:

1. Apparatus for producing a three-dimensional work of art comprising in combination a body of expanded plastic material capable of being dissolved by a solvent, a quantity of said solvent, and means a hand held applicator for applying to selected portions of said body a quantity of said solvent sufficient to etch the body at the point of application, said applicator including a container for said solvent and an exposed porous tip extending from said container and applying said solvent from said container to said body only when said tip is in contact with said body.

2. Apparatus according to claim 1 and said applicator further including a mass of absorbent material disposed in said container and saturated by said solvent.

3. Apparatus according to claim 1 wherein a quantity of coloring agent is mixed with said solvent in said container and said tip applies said coloring agent with said solvent to simultaneously etch and color the body at the point of application.

4. Apparatus according to claim 3 and said applicator further including a mass of absorbent material disposed in said container and saturated by said solvent and coloring agent.

References Cited

UNITED STATES PATENTS

| 3,192,063 | 6/1965 | Donofrio | 117—33 X |
|---|---|---|---|
| 2,568,803 | 9/1951 | Guenst | 156—7 X |
| 3,458,340 | 7/1969 | Karsten | 117—8 X |
| 2,572,719 | 10/1951 | Ginell et al. | 264—341 X |
| 3,516,888 | 6/1970 | Bahner | 161—164 X |

WILLIAM A. POWELL, Primary Examiner

U.S. Cl. X.R.

117—12, 38, 138.8; 156—7; 161—116, 413